US00RE39855E

(19) United States
(12) Reissued Patent
Wong

(10) Patent Number: US RE39,855 E
(45) Date of Reissued Patent: Sep. 25, 2007

(54) POWER MANAGEMENT STRATEGY TO SUPPORT HOT SWAPPING OF SYSTEM BLADES DURING RUN TIME

(75) Inventor: Hong W. Wong, Portland, OR (US)

(73) Assignee: Intel Corporation, Santa Clara, CA (US)

(21) Appl. No.: 11/068,640

(22) Filed: Feb. 25, 2005

Related U.S. Patent Documents

Reissue of:
(64) Patent No.: 6,528,904
Issued: Mar. 4, 2003
Appl. No.: 09/676,102
Filed: Sep. 29, 2000

(51) Int. Cl.
*H01H 3/26* (2006.01)

(52) U.S. Cl. ..... 307/140; 307/135; 307/139; 307/147; 307/119; 361/58

(58) Field of Classification Search ..... 307/140, 307/135, 139, 147, 119; 361/58
See application file for complete search history.

(56) References Cited

U.S. PATENT DOCUMENTS 5,207,586 A 5/1993 MacGregor et al.
5,317,697 A * 5/1994 Husak et al. ..... 395/325
5,546,590 A 8/1996 Pierce
5,555,510 A 9/1996 Verseput et al.
5,606,704 A 2/1997 Pierce et al.
5,619,660 A 4/1997 Scheer et al.
5,796,185 A * 8/1998 Takata et al. ..... 307/140
6,041,375 A * 3/2000 Bass et al. ..... 710/302
6,183,307 B1 2/2001 Laity et al.
6,310,410 B1 * 10/2001 Lin et al. ..... 307/119
6,353,523 B1 * 3/2002 Niv et al. ..... 361/79

OTHER PUBLICATIONS

PC Card Standard, Release 7.0—Personal Computer Memory Card International Association (PCMCIA)/Japan Electronics and Information Technology Industries Association (JEITA), Published Feb. 1999.

* cited by examiner

*Primary Examiner*—Robert L. Deberadinis
(74) *Attorney, Agent, or Firm*—Ramin Aghevli; Caven & Aghevli, LLC

(57) ABSTRACT

A hot swappable system is described. It included software controlled hot swapping operations which provided a graceful booting or power-down of the system. In the even of force insertion or extraction of the system blades, a set of hardware features (such as using different pin lengths in the connectors and dampening resistor) prevents these types of operations from damaging the system hardware or affecting the operation states of other blades within the system.

24 Claims, 4 Drawing Sheets

POWER MANAGEMENT STRATEGY TO SUPPORT HOT SWAPPING OF SYSTEM BLADES DURING RUN TIME

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates to the field of systems with hot swappable components.

2. Prior Art and Related Art

In many applications it is necessary to have a system which remains in operation even when under repair. For instance, a server in a network may have boards or blades in a standby mode or with excess capacity. When a blade is detected as having failed, other blades that were in a stand-by mode take over while the failed blade is replaced. Alternatively, blades with excess capacity are used to pickup the tasks of the failed blade while it is replaced. Generally, an alarm or other indication is given to an operator indicating that a failure has occurred. The operator is then able to remove the failed blade and reinsert a good blade. One of the major problems in these systems is the management of power as these changes occur.

Often in such systems connectors are used having pins of different lengths which cooperatively engage sockets. For instance, a backplane in a server may have a plurality of connectors, each for receiving a blade where the pins in the connectors are of different lengths. These pins are used for instance, to allow discharge of static electricity as well as other functions.

DETAILED DESCRIPTION OF THE PRESENT INVENTION

A system is described having a backplane bus and a plurality of blades or boards which may be extracted or inserted while the system is in operation. This is often referred to as "hot swapping."

In the following description, numerous specific details are set forth, such as specific voltages in order to provide a thorough understanding of the present invention. It will be apparent to one skilled in the art that the present invention may be practiced without these specific details. In other instances, well-known circuits and other components have not been set forth in detail in order not to obscure the present invention.

Figure 1:
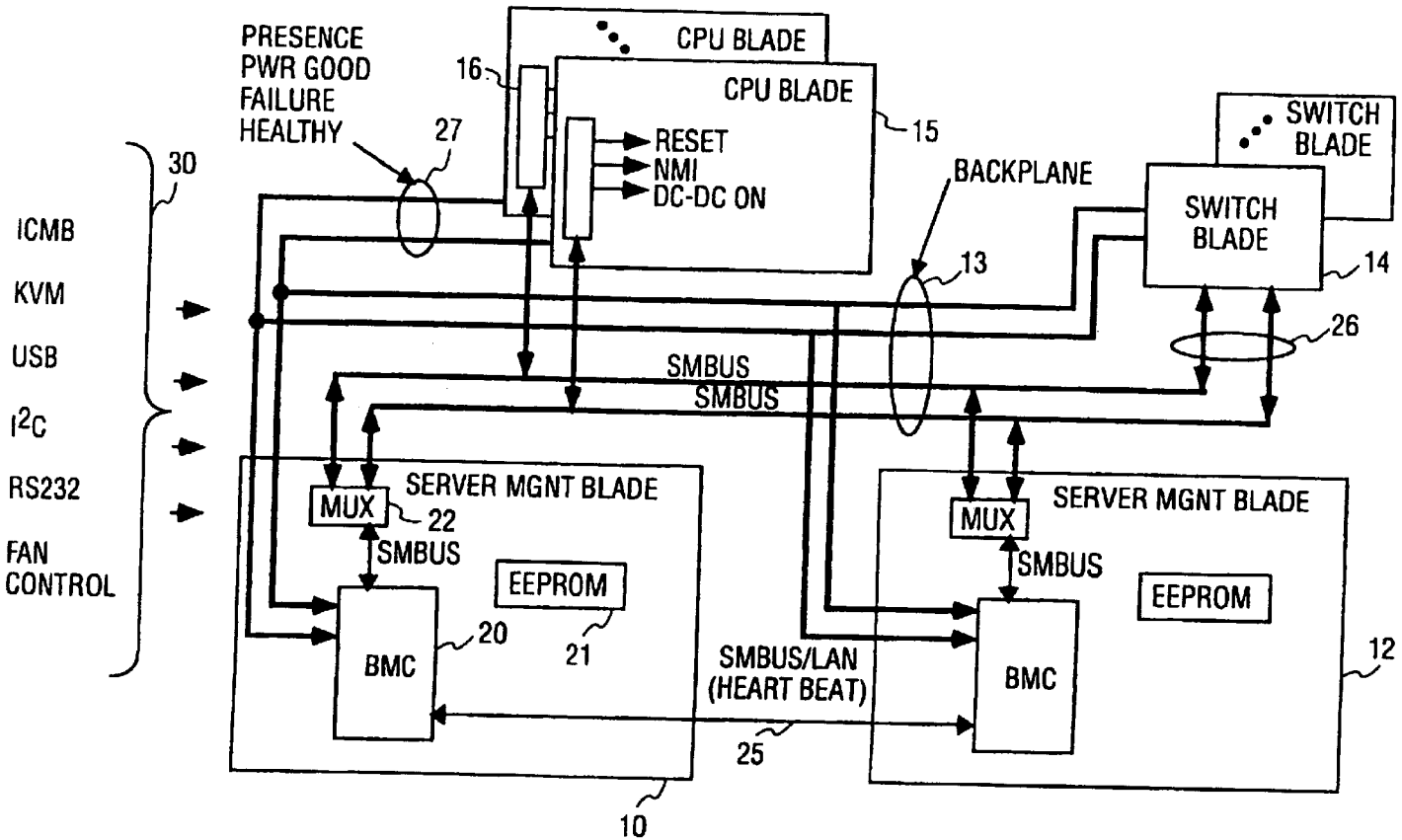
FIG. 1 is a block diagram of a system built in accordance with the present invention.

The present invention is described in connection with a server having hot swappable blades. Referring to FIG. 1, the system includes a backplane bus only a portion of which is shown in FIG. 1. Lines 13 and buses 30 are the only portion of the backplane shown, power and ground lines are not shown. The buses shown by the bracket 30 include the Interchassis Management Bus (IMB), Universal Serial Bus (USB), Keyboard/Video/Mouse (KVM) bus, $I^2C$ bus, RS232 port and a fan control bus. Other buses may be used. While the system management bus (SM Bus) is shown as part of the backplane in FIG. 1, the SM Bus in one embodiment is a separate bus interconnecting the blades in the system.

In one embodiment, the server includes several different units which may be hot swapped and which engage the backplane bus. These include the two server management blades (MBs) shown in FIG. 1 as blades 10 and 12. The server also includes at least one switch blade 14 and typically include 2 more switch blades. These switch blades provide network switching of packets and routing for various protocol layers such as layers 2, 3, 4 to 7. Additionally there are a plurality of central processing unit (CPU) blades, for instance, 38 CPU blades may be used or even a higher number. Two such blades 15 and 16 are shown in FIG. 1. These blades perform the normal computing functions required of a server.

While not shown in FIG. 1, the system also includes at least one power sharing board for distributing power (48V DC in one embodiment) to the various blades in the system from the backplane. Also, multiple fans are used for cooling which is often the case in such systems.

The present invention provides operating characteristics for the server which meet the predetermined criteria shown below in a table.

| | Blade Status | | | | | | |
|---|---|---|---|---|---|---|---|
| Hot Swap States | Operation State | 3 V or 5 V stby | Reset | 48 V DC Cvtr | CPU Blade | Switch Blade | System Mgmt Blade |
| P0 | The blade is physically separated from the system | | | | Yes | Yes | Yes |
| P1/H0 | The blade is fully seated | On | On | Off | Yes | Yes | Yes |

-continued

| Hot Swap States | Blade Status: Operation State | 3 V or 5 V stby | Reset | 48 V DC Cvtr | CPU Blade | Switch Blade | System Mgmt Blade |
|---|---|---|---|---|---|---|---|
| H1 | The blade is fully seated and powered up | On | On | On | | | |
| H2 | The blade is allowed to boot up to BIOS/Embedded SW/Diagnostics partition | On | Off | On | Yes | Yes | Yes |
| H1F | The blade is allowed to boot up, but the board has detected an error and powered itself down. BIOS/embedded SW stopped running | On | Off | Off, over-ridded by blade | Yes | Yes | Yes |
| H3 | The blade is powered up and is operating in its normal state, with OS or Embedded SW running | On | Off | On | Yes | Yes | Yes |

In the table above the hot swap states include P0 which is the state where the board is removed from the backplane and P1, the states where a blade is fully inserted into the backplane. The state H0 through H3 indicate several operational states for the blade as indicated in the above table. The "Yes" in the last three columns of the table indicate that the CPU blade, switch blades and SMBs support the indicated hot swap states.

While the server operates primarily on 48V DC there is also a 3V or 5V standby power used for a sleep mode. The state of that power is shown under "5V stby" in the above table. The system also employs a reset signal which is discussed below and shown in the table. The power management apparatus of the present invention, as will become apparent from the description below, provides the capability shown in the table.

Each of the blades includes a power supply which, in one embodiment, is a DC-to-DC converter for filtering and regulating the 48V power. The converter is enabled with an enable signal as will be discussed. The state of the converter is shown as either "off" or "on" in the above table.

One of the major problems in a hot swappable system is providing power to the blades and maintaining the power when the blades are hot swapped. The removal and insertion of blades often causes transients in the power delivery system which affect the operation of other blades and the power subsystem.

Figure 5:
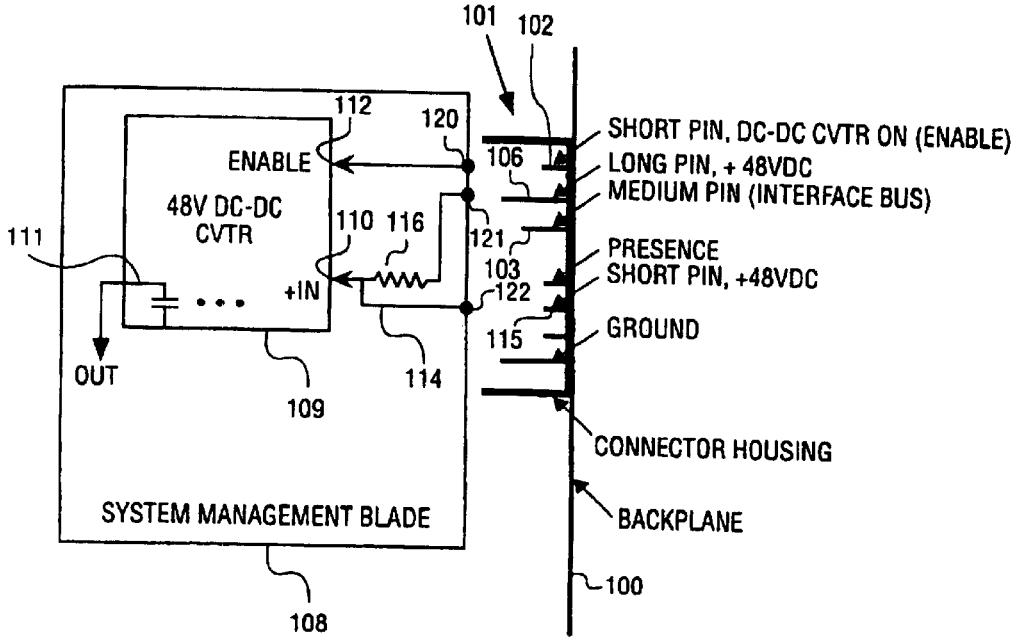
FIG. 5 is a diagram illustrating a backplane, a connector with pins of three different lengths and a blade which cooperatively engages the connector in accordance with the present invention.

In one embodiment of the present invention each of the blades includes a female connector and a corresponding male connector in the backplane having pins of three different lengths. This is shown in FIG. 5 where backplane 100 is shown along with a male connector 101. The male connector 101 has a plurality of pins only a few of which are shown in FIG. 5. Each of the pins are one of three lengths, a first and longest length such as pin 106; the shortest length such as pin 102; and, a medium length pin which is longer than the shortest length pin and shorter than the longest length pin such as pin 103. The corresponding female socket in each of the blades such as blade 108 of FIG. 5 includes a plurality of sockets each of which cooperatively engages its respective pin.

While typically the male connector is part of the backplane and the female connector is on the blade, in another embodiment the male connector may be on the blade and the female connector in the backplane. In this patent "pin/socket" is sometimes used to indicate that either the pin or the socket is being designated, depending on whether the backplane has the male or female connector. The term pin/socket indicates, for instance, that the socket cooperatively receives a pin of a designated length.

As is apparent from FIG. 5, as the blade 108 is inserted, electrical contact will first be made between the longest pins such as pin 106 and corresponding sockets such as socket 121. As insertion continues, the medium length pins next make contact such as the pin 103. And finally, as insertion continues the shortest pins such as pins 102 and 105 make contact with sockets 120 and 125, respectively. Likewise on extraction, first the shortest pins/sockets part, followed by the medium pins/sockets, and finally the longest pins/sockets separate.

Each of the blades includes a power supply which in one embodiment is a 48V DC-to-DC converter. As shown in FIG. 5 the converter 109 has an input terminal which receives input power for the blade from lines in the backplane 110. Each of the converters has an output terminal 111 which provides regulated DC power for the blade. The converters also has an enable terminal 112 that controls an enable function in the converter. This turns the converter "on" or "off". When turned off, that is when disabled, the input terminal 110 is effectively decoupled from the output terminal 111. This decouples the substantial capacitance typically found at the output of a converter from terminal 110.

The input terminal to the converter receives power from two different lines. A first lines 114 is connected to the shortest length of the three pin/socket lengths (pin 115 and socket 122). The input terminal 110 also receives power from a long pin/socket namely pin 106 and socket 121. This pin/socket is connected to the input terminal 110 through a resistor 116. This resistor as will be discussed, plays an important role in dampening transient currents to the blade. The ground connection to the blade is through a long pin/socket.

The data signals are connected to the medium pins/sockets such as through pin 103.

Referring again to FIG. 1, there are several signals used for the power management which are specifically shown in FIG. 1. Lines 27 provide signals from the CPU blade 15 and the switch blade 14 to the blade microcontrollers 20 of the MBs 10 and 12. These signals include a "presence signal" which indicates the presence of the board. Thus, when a board is seated in the backplane, the microcontrollers on the MBs can detect the presence of each of the boards individually. Another signal is the "power good" signal. This signal indicates that a blade once installed, has the proper power. This is detected at the output of the DC-to-DC converter. Another signal is a signal to indicate the health or failure of a board. Internal circuitry on the board, for instance self-test circuitry, can indicate when a blade has failed and provide a signal to the MBs indicating such failure.

The lines 26 which are the system management (SM) bus provide control signals from the MBs 10 and 12 to the other blades in the system. Among the signals provided as shown at the blade 15 are a reset signal, a converter enable signal shown as "DC—DC on" and the non-maskable interrupt (NMI) signal. All of the signals discussed in connection with lines 26 and 27 may be encoded onto a serial bus such as the $I^2C$ bus for distribution to the blades.

In one embodiment there are two server MBs 10 and 12. One of these two blades is active and the other is in stand-by. Lines 25 in one embodiment comprising a separate bus interconnecting the MBs 10 and 12. This bus provides a signal between the MBs indicating the health of the MBs. For instance, the inactive MB may periodically ping the active MB to determine its health. If the inactive blade determines that the active MB has failed it can power up and take over the system management. To this end, a multiplexer (e.g., MUX22) is used at the output of each of the MBs to allow the selection of appropriate SM bus signals. EEPROMs on the MBs (such as EEPROM 21) allow each MB to be prepared to take over at anytime since each stores the data needed for continued operation of the system.

Thus, while one of the MBs handles the housekeeping chores, the other one acts as a hot spare. The peer-to-peer heartbeat monitor (or similar implementation) as mentioned is used for one blade to monitor the status of the other blade. If the active management blade fails to respond to the heartbeat "pinging," that blade is considered to fail and the hot spare blade takes over. A failure LED on the face plate of the failed management blade turns on and an alert is sent out by the hot spare to warn a system administrator of the failure event.

Figure 2A:
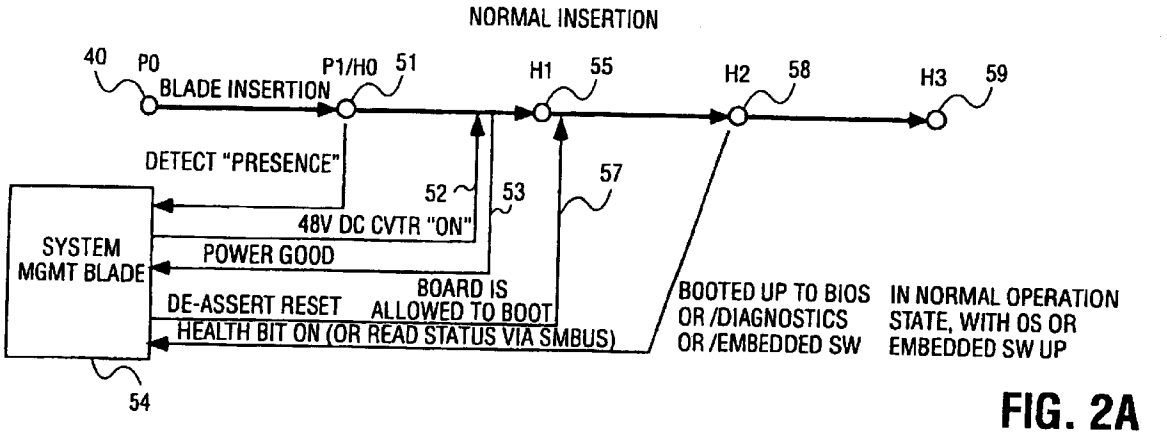
FIG. 2A is a flow diagram illustrating the events occurring during the normal insertion of a blade into the system of FIG. 1.

Referring now to FIG. 2A, the operation of a system is illustrated for the normal insertion of a blade. At P0 indicated by 40, the blade is separated from the backplane. At 51 (P1/H0) the blade is fully inserted into the backplane and at this time the blade provides an indication to the server MB 52 indicating its presence. This may be, for instance, the closing of a loop through the inserted blade or a signal provided by the 5V power supply. When the system MB 52 senses the presence of the blade it enables the power supply as shown by line 52. This is the signal which is connected to the terminal 112 of the DC converter as shown in FIG. 5. Once the power supply is activated, a "power good" signal may be provided to MB 54 as indicated by line 53. A "power good" signal can be provided by a power sensing chip on the blade, as an example. Thus, at H1 indicated by 55 the board is fully seated and its power is on.

Now the MB 54 deasserts the reset signal allowing the newly inserted blade to boot up. This is indicated by the line 57. At H2 indicated by 58, the inserted blade indicates that it is on and healthy by the health bit over the backplane or over a separate SM bus. At H3 indicated by 59, normal operation of the inserted blade occurs with the blade operating system or embedded software up and running.

Figure 2B:
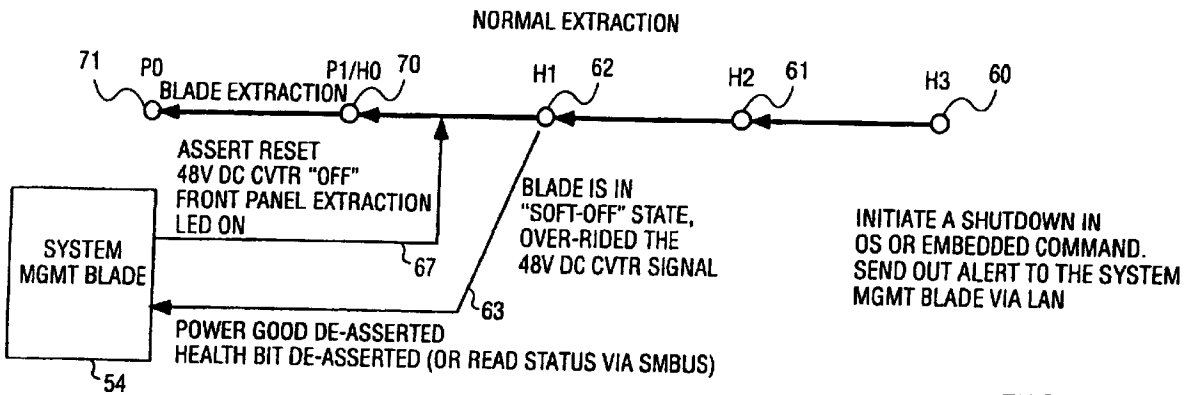
FIG. 2B is a flow diagram illustrating the events occurring during the normal extraction of a blade from the system of FIG. 1.

FIG. 2B indicates a normal extraction. For normal extraction, an operator initiates a shut-down process in the operating system or a similar command in the embedded software. An alert-on-LAN message to the MB 54 occurs. The blade that will be extracted then goes through a normal shut-down and places itself into a soft-off state. This indicated in FIG. 2B by the transition from H3 (60) to H2 (61) then to H1 (62). At this point in time, the blade to be extracted deasserts the health bit as indicated by line 63. Now MB 54 asserts reset and then disables the converter as indicated by line 67. Typically, an LED on the front panel of the blade to be extracted illuminates indicating to the operator that the blade may now safely be removed. This is indicated by the transition from H1/H0 (70) to P0 (71).

Figure 3:
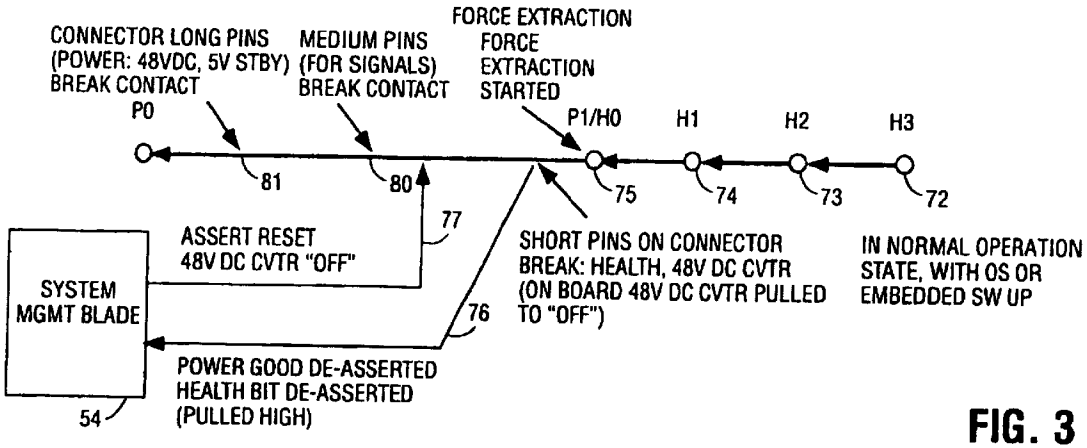
FIG. 3 is a flow diagram illustrating the events occurring during the forced extraction of a blade from the system of FIG. 1.

The normal insertion and extraction is obviously the easier case to deal with from the standpoint of power management and power transients. FIG. 3 illustrates the more difficult case of a forced extraction. This case assumes that the board is extracted without first informing the MB 54 of FIG. 3. The transitions from 72 to 73 to 74 to 75 occur almost instantaneously. The MB 54 is able to detect this unplanned extraction of a blade, such as a CPU node, and perform the necessary remedial section.

As shown by line 76, as the blade is extracted the short pins/sockets of the connector such as pin 102 and socket 120 of FIG. 5, first disengage. Among the short pins/sockets that first disengage is a pin carrying the enable signal to the power supply. When this path breaks the converter is shut-down and input terminal 110 of the converter is substantially disconnected from the output terminal 111. Thus the capacitance associated with the output of the converter is disconnected from the input terminal. The 48V power supply to the input of the converter (which bypasses resistor 116) is also disengaged since it is connected to the converter on a short pin/socket.

At this time the "power good" signal is deasserted and the health bit is deasserted as shown by line 76. As indicated by line 77, the MB 54 deasserts the enable signal for the converter. This is done to prevent a re-powering up of the blade if the blade were to be reinserted immediately. If this were not done and the blade was immediately reinserted, the large capacitance associated with the output of the converter would be immediately coupled through the short pin providing the direct connection to the 48V power supply. This would cause an unwanted transient which may affect other blades in the system.

Next as indicated at 80, the medium length pins/sockets break contact. These include the data signals associated with the CPU and switching blades. At 81 the long pins/sockets break contact. Among the long pins that break contact at this point is the 48V power supply which is coupled to the input of the converter through the resistor 116 of FIG. 5. Both on extraction and on reassertion this resistor dampens the transients associated with decoupling and decoupling the converter from the backplane. This is particularly important if, for example, for some reason the power supply remains enabled during immediate reassertion. If this were to occur, the first power applied to the converter would be through the resistor 116 dampening the surge which occurs when the converter is abruptly activated. By the time the shortest pins/sockets make contact this transient will have diminished. As also indicated at 81 the stand-by power being on one of the longest pins/sockets also breaks contact.

Figure 4:
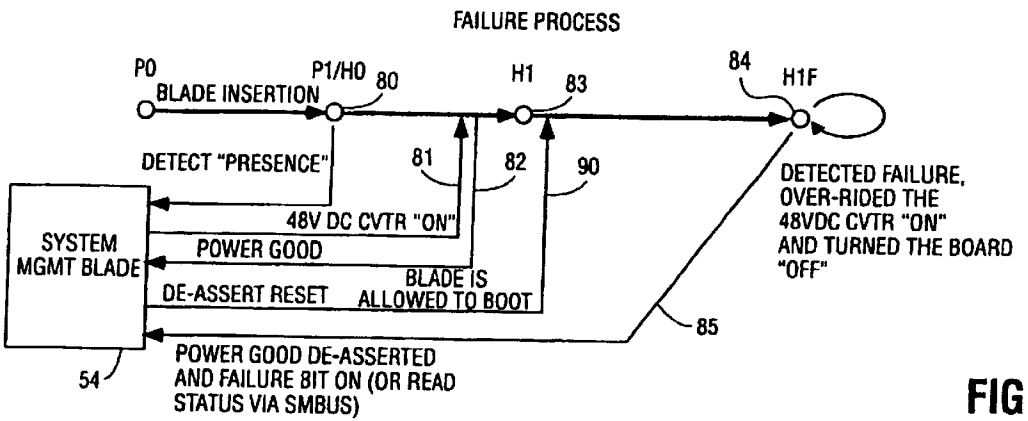
FIG. 4 is a flow diagram illustrating the events occurring during the failure process of a blade in the system of FIG. 1.

FIG. 4 illustrates the case where a failure occurs on boot up. As indicated at 80, the blade is inserted and its presence detected by the MB 54. 81 indicates the normal activation of the power supply. 82 indicates that the blade has good power and that at this point the insertion process is proceeding normally. After H1 (83) as indicated by 84, reset is deasserted and the blade is allowed to boot up. Assume shortly thereafter, as indicated at 84, failure occurs (H1F) the blade itself deactivates the power supply and: informs the MB 54 of the failure. This is the response that would occur if for instance, an on-blade sensor detects an overheat condition. At this point the MB 54 asserts reset and disables the converter.

Thus, a power management system has been described for a system having hot swappable blades.

What is claimed is:

1. A hot swappable blade comprising:

an enableable power supply having enable and power input terminals and a power output terminal, to provide power to circuitry on the blade [connected] *coupled* to the power output terminal in response to receiving an enable signal on the enable terminal;

a connector having first, second and third pin/sockets, the first pin/socket being longer than the second and third pin/sockets;

the first and second pins/sockets being [operatively] coupled to the power input terminal of the enableable power supply and the third pin/socket [operatively] coupled to the enable terminal of the enableable power supply; and an impedance element connected between the first pin/socket and the power input terminal.

2. The blade [defined by] *of* claim 1, wherein the third pin/socket is approximately the same length as the second pin socket.

3. The blade [defined by] *of* claim 2, wherein the connector includes a plurality of fourth pins/sockets for receiving data, the fourth pins/sockets having a length intermediate between the first and second pins/sockets.

4. The blade [defined by] *of* claim 1, wherein the connector includes a plurality of data pins/sockets for receiving data, the data pins/sockets having a length intermediate between the first and second pins/sockets.

5. The blade [defined by] *of* claim 1, wherein the power supply is a DC-to-DC converter.

6. The blade of claim 1, wherein the circuitry includes a processor, and the connector includes a reset pin/socket [by which] *to receive* a reset signal [may be received] to reset the processor.

7. The blade of claim 1, wherein the blade may be used in a system including a backplane to which the blade may be [connected] *coupled* via the connector, and the connector further includes a presence pin/socket used for determining if the blade is properly [connected] *coupled* to the backplane.

8. The blade of claim 1, wherein the connector further includes a power good pin/socket [by which the blade can] *to* assert a power good signal.

9. The blade of claim 1, wherein the connector further includes a health pin/socket [by which the blade can] *to* assert a health signal [signifying the] *to signify blade* health or *blade* failure [of the blade].

10. The blade of claim 1, further comprising a failure light-emitting diode (LED) [by which the blade can] *to* indicate a failure status.

11. A system comprising:

a backplane [bus];

a plurality of blades each having a connector to [engage] *couple to* the backplane [bus] including two management blades (MBs) and a plurality of other blades (OBs);

each connector having first pins/sockets of a first length, second pins/sockets of a second length and third pins/sockets of a third length; the first length being the longest length, the third pins/sockets being the shortest length and the second length being longer than the third length and shorter than the first length;

the backplane [bus] having power lines [which cooperatively engage] *to provide power through* one of the first pins/sockets and one of the third pins/sockets on each of the blades, *wherein each of the blades includes a resistor connected to the one of the first pins/sockets that receives power from the power lines*.

12. The system [defined by] *of* claim 11, wherein data is communicated among the blades over [the backplane] *a* bus *in the backplane* through the second pins/sockets [on each of the blades].

[13. The system defined by claim 11 wherein each of the blades includes a resistor connected to the one of the first pins/sockets that receives power from the power line.]

14. The system [defined by] *of* claim [13] *11*, wherein each of the OBs provides a signal [indicating] *to indicate* its presence in the backplane over one of the third pins/sockets.

15. The system [defined by] *of* claim 14, wherein each of the OBs includes a DC-to-DC converter which is enabled by an enable signal received over one of the third pins/sockets from [the backplane] *a* bus *in the backplane*.

16. The system [defined by] *of* claim 15, wherein the enable signals for the OBs originates from one of the MBs.

17. The system [defined by] *of* claim 15, wherein each of the OBs provides a signal to at least one of the MBs [indicating] *to indicate* the status of its DC power.

18. The system [defined by] *of* claim 17, wherein the system is a server.

19. The system [defined by] *of* claim 18 including an additional bus *in the backplane* connecting to the MBs.

20. The system [defined by] *of* claim 19, wherein signals [indicating] *are communicated over the additional bus to indicate* the health of the MBs [is communicated over the additional bus].

21. The system [defined by] *of* claim 20, wherein the OBs include a plurality of central processing unit blades and a plurality of switch blades.

22. The system [defined by] *of* claim 11, wherein the system is a server.

23. The system of claim 11, wherein one of the [two management blades] initially operates as an active management blade and the other operates as a standby management blade, and wherein the standby management blade is configured to monitor an operating status of the active management blade, and in response to determining the primary management blade is not operating properly, the system enables the standby management blade to take over operations previously performed by the active management blade, thus becoming a new active management blade.

24. The system of claim 23, wherein the system is further configured to annunciate a status indicator on the management blade that is initially the active management blade in response to detection that that blade has failed.

*25. The system of claim 11, wherein the backplane comprises a backplane bus.*

* * * * *

UNITED STATES PATENT AND TRADEMARK OFFICE

CERTIFICATE OF CORRECTION

PATENT NO. : RE 39,855 E
APPLICATION NO. : 11/068640
DATED : September 25, 2007
INVENTOR(S) : Wong It is certified that error appears in the above-identified patent and that said Letters Patent is hereby corrected as shown below:

In column 8, line 49, in Claim 23, after “blades]” insert -- MBs --.

In column 8, line 62, in Claim 24, delete “that” before “blade”.

Signed and Sealed this

Sixth Day of May, 2008

JON W. DUDAS
*Director of the United States Patent and Trademark Office*